United States Patent
Chia et al.

[19]

[11] Patent Number: 5,945,938
[45] Date of Patent: Aug. 31, 1999

[54] RF IDENTIFICATION TRANSPONDER

[75] Inventors: Yan Wah Chia; Tsien Ming Au, both of Singapore, Singapore

[73] Assignee: National University of Singapore, Singapore

[21] Appl. No.: 08/968,381

[22] Filed: Nov. 12, 1997

[30] Foreign Application Priority Data

Nov. 14, 1996 [SG] Singapore .......................... 9611140-6

[51] Int. Cl.⁶ .................................................. G01S 13/76
[52] U.S. Cl. .............................. 342/42; 342/51; 342/175
[58] Field of Search .................... 342/42, 44, 50, 342/51, 175

[56] References Cited

U.S. PATENT DOCUMENTS

| | | | |
|---|---|---|---|
| 3,496,570 | 2/1970 | Lewis | 343/754 |
| 3,731,313 | 5/1973 | Nagal | 342/370 |
| 4,283,729 | 8/1981 | Richardson | 342/380 |
| 4,926,187 | 5/1990 | Sugawara et al. | 342/361 |
| 5,254,997 | 10/1993 | Cohn | 342/44 |
| 5,361,071 | 11/1994 | Van Zon | 342/42 |
| 5,622,886 | 4/1997 | Allum et al. | 438/238 |

OTHER PUBLICATIONS

Frequency–Scanned Grating Consisting of Photo–Etched Arrays, F. Stefan Johansson, IEEE Transactions on Antennas and Propagation, vol. 37, No. 8, Aug., 1989.

*Primary Examiner*—John B. Sotomayor
*Attorney, Agent, or Firm*—Klarquist Sparkman Campbell Leigh & Whinston LLP

[57] ABSTRACT

An RF identification transponder comprises a substrate layer, and an array of M*N antenna elements formed on the substrate layer, where M and N are integers. The antenna elements have a common predetermined resonant frequency $f_r$. The resonant frequency of the transponder's antenna element array allows it to be identified apart from other transponders, each having an antenna element array with a different resonant frequency.

30 Claims, 12 Drawing Sheets

$\phi$: phase

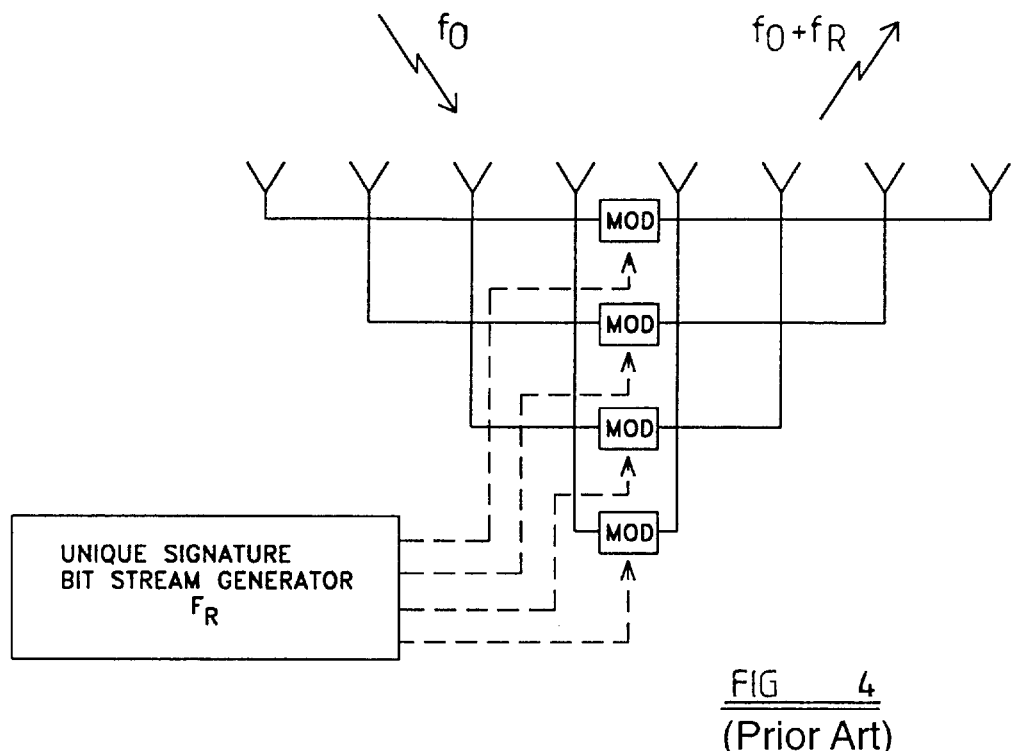
FIG 4
(Prior Art)
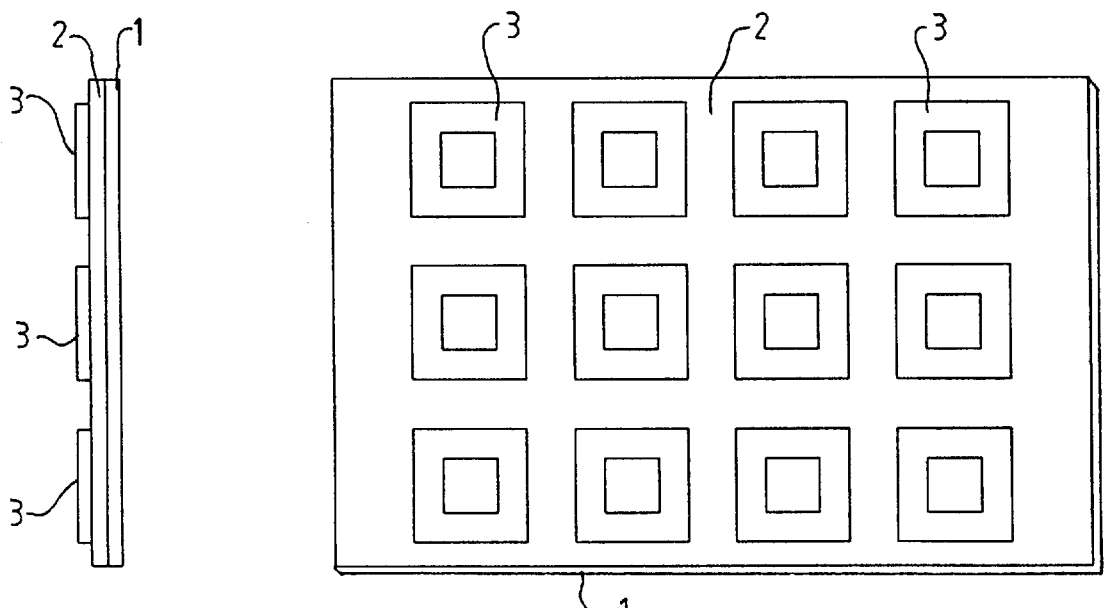
FIG 5
(Prior Art)
FIG 6
(Prior Art)

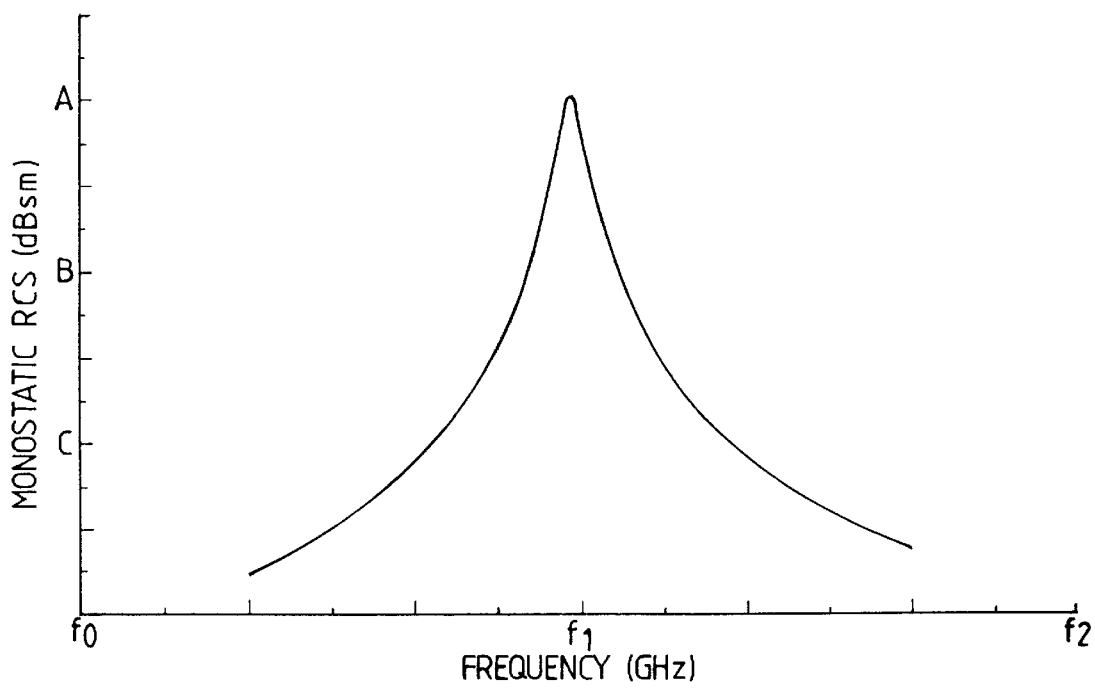
FIG 7
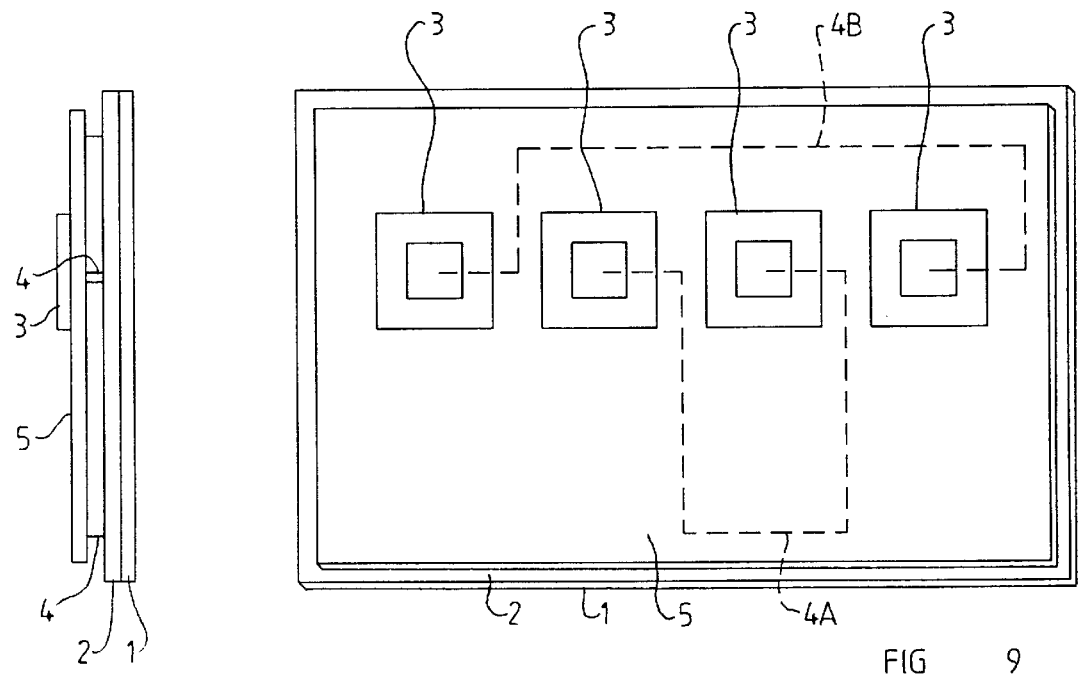
FIG 8
FIG 9

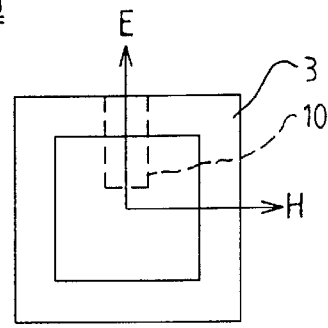
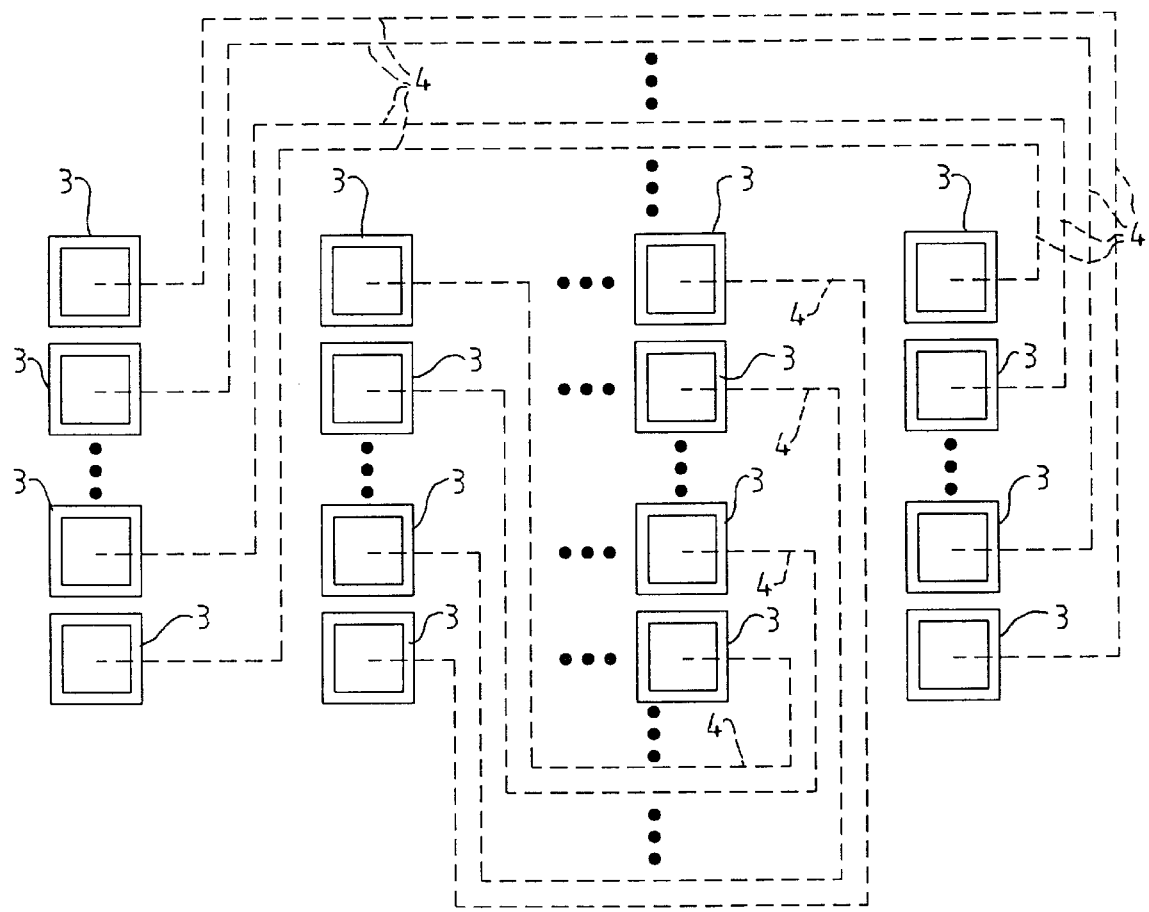

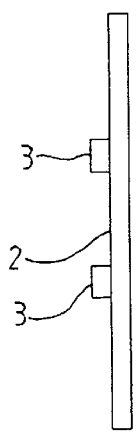
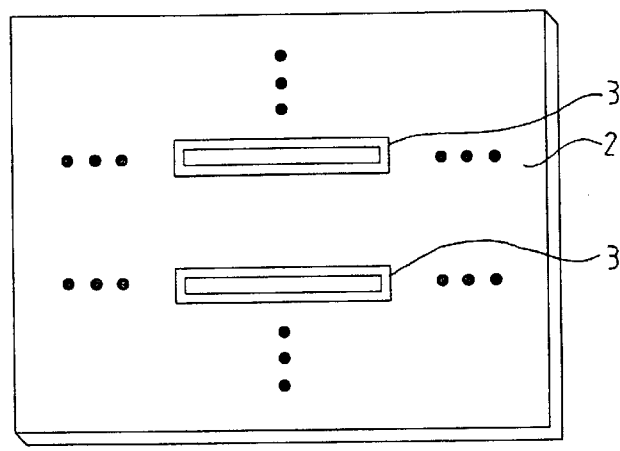
FIG 25     FIG 26
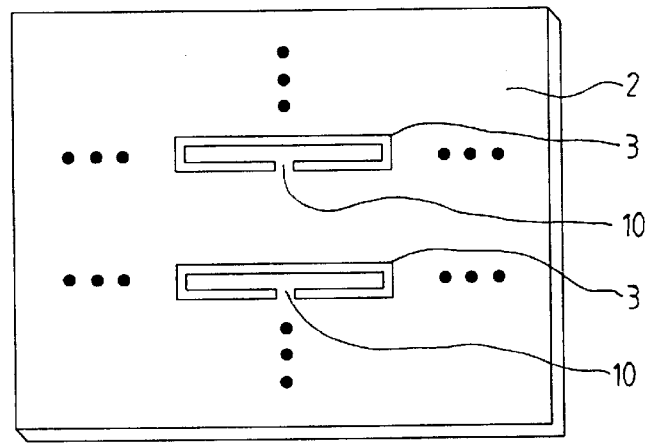
FIG 27
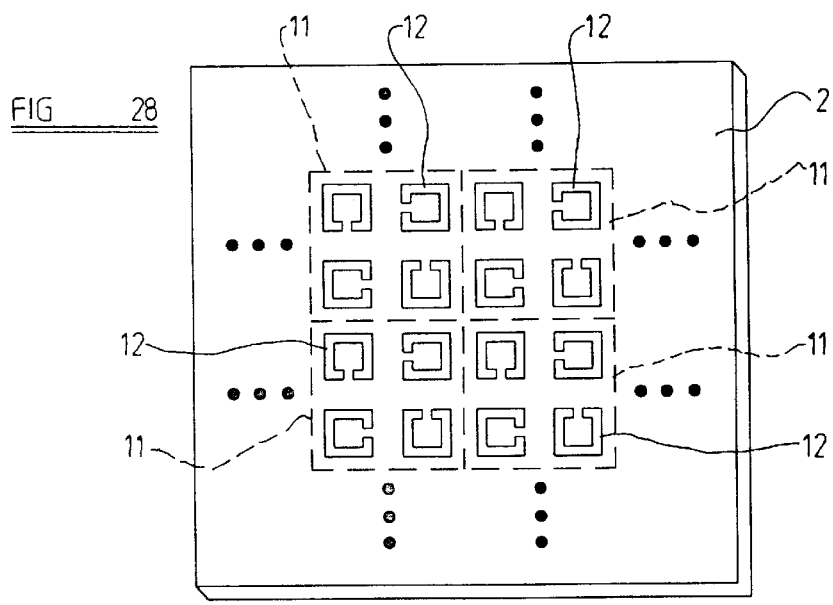
FIG 28

RF IDENTIFICATION TRANSPONDER

FIELD OF THE INVENTION

THIS INVENTION relates to an RF Identification Transponder.

BACKGROUND

Radio-frequency (RF) including microwave frequency transponders are used for contactless identification, remote location and tracking of physical objects to which the transponders are fixed. Such transponders are used in supermarkets, for warehouse inventories, on vehicles and on personnel. Typically, each transponder has a unique identification code which is modulated and transmitted on an RF carrier or microwave frequency. The transponder is interrogated by a reader which transmits an RF signal to the transponder. The transponder responds by returning its identification code to the reader.

So-called passive transponders often employ transmitters powered by the radio frequency or microwave signal received from the transponder reader. Power conversion circuitry is provided in the transponder but is often restricted by the performance of the diodes and other components therein. As a result, the range of so-called passive transponders (such as the transponder shown in FIG. 1 of the accompanying drawings) is severely limited, especially in the microwave frequency range of above 1 gigahertz.

Such transponders usually transmit over a wide undirected radiation pattern and thus the power of the signal from the transponder is dissipated quickly. This serves to reduce the range of operation between the transponder and reader. Retrodirective or Van Atta arrays enhance the range of such transponder reader systems by correcting the phase of the wavefront impinging on the transponder and redirecting the wave back to the reader in the same direction from which the wave was transmitted.

As show in FIGS. 2 and 3 of the accompanying drawings, respective pairs of antenna elements are connected by equal lengths of co-axial cable connection lines to form a Van Atta array. However, such Van Atta arrays are large and unwieldy due to the constraints imparted on the system because of the equal connection line lengths between antenna elements.

Various methods of improving the retrodirectivity of transponders have been put forward and are disclosed in, for example, U.S. Pat. No. 3,496,570 which uses a slab of dielectric to cancel specularly reflective waves and U.S. Pat. No. 3,731,313 which uses impedance matching stubs attached to respective connection lines.

U.S. Pat. No. 5,254,997 discloses an RF transponder incorporating a Van Atta array. However, the transponder disclosed therein operates by receiving the first signal, modulating the first signal with an identification code and then reflecting the modulated signal back to an interrogator. Such a transponder is shown schematically in FIG. 4 of the accompanying drawings.

SUMMARY

The present invention seeks to provide a transponder which is simple to manufacture at low cost, and which does not require complicated circuitry or further components such as diodes or the like.

Accordingly, one aspect of the present invention provides an RF identification transponder comprising: a substrate layer; and an array of M*N antenna elements formed on the substrate layer, wherein the antenna elements have a common predetermined resonant frequency $f_r$ and M and N are integers.

A further aspect of the present invention provides an RF transponder reader in combination with a transponder according to the present invention, the reader comprising: means for generating and transmitting signals at a range of frequencies, wherein at least one of the frequencies in the range of frequencies is substantially equal to the or each resonant frequency of the transponder; and means for detecting said one or each resonant frequency.

BREIF DESCRIPTION OF THE DRAWINGS

In order that the present invention may be more readily understood, embodiments thereof will now be described, by way of example, with reference to the accompanying drawings, in which:

FIG. 4 is a schematic circuit diagram of another form of known identification transponder;

FIG. 5 is a side view of a transponder embodying the present invention;

FIG. 6 is a plan view of the transponder of FIG. 5;

FIG. 7 is a graph showing the frequency response of the transponder of FIGS. 5 and 6;

FIG. 8 is a side view of another transponder embodying the present invention;

FIG. 9 is a plan view of the transponder of FIG. 8;

FIG. 21 is a schematic representation of an antenna element for use with the present invention provided with a stub;

FIG. 22 is a schematic representation of an array of antenna elements for use with the present invention coupled to connection lines of unequal length using optimised routings;

FIG. 25 is a side view of a transponder embodying the present invention;

FIG. 26 is a plan view of the transponder of FIG. 25;

FIG. 27 is a plan view of a transponder embodying the present invention having an antenna array of C-type antenna elements;

FIG. 28 is a plan view of a transponder embodying the present invention having an antenna array comprising an array of unit cells of C-type antenna elements;

DETAILED DESCRIPTION

Figure 1:
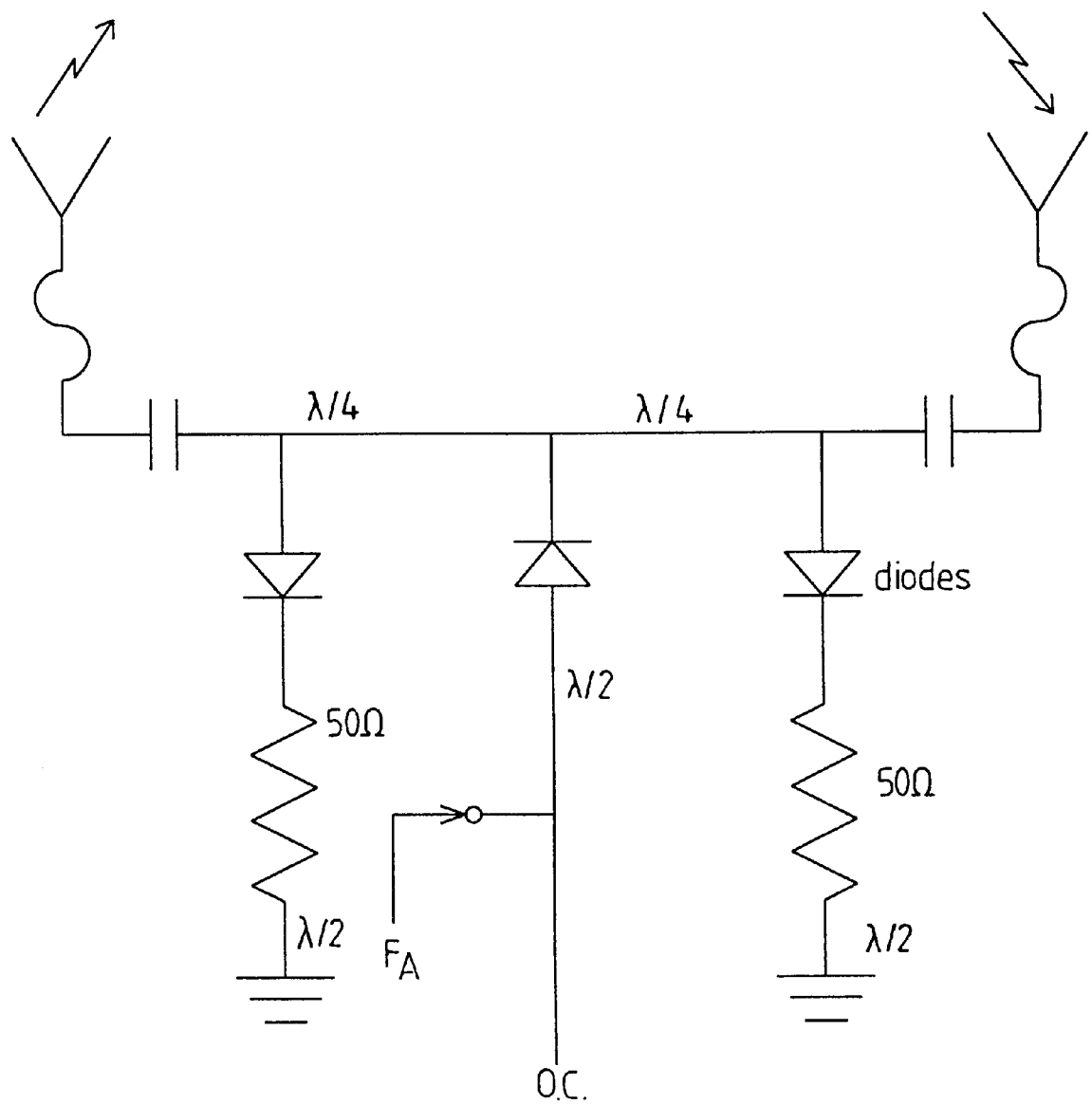
FIG. 1 is a schematic circuit diagram of a known transponder.
Figure 2:
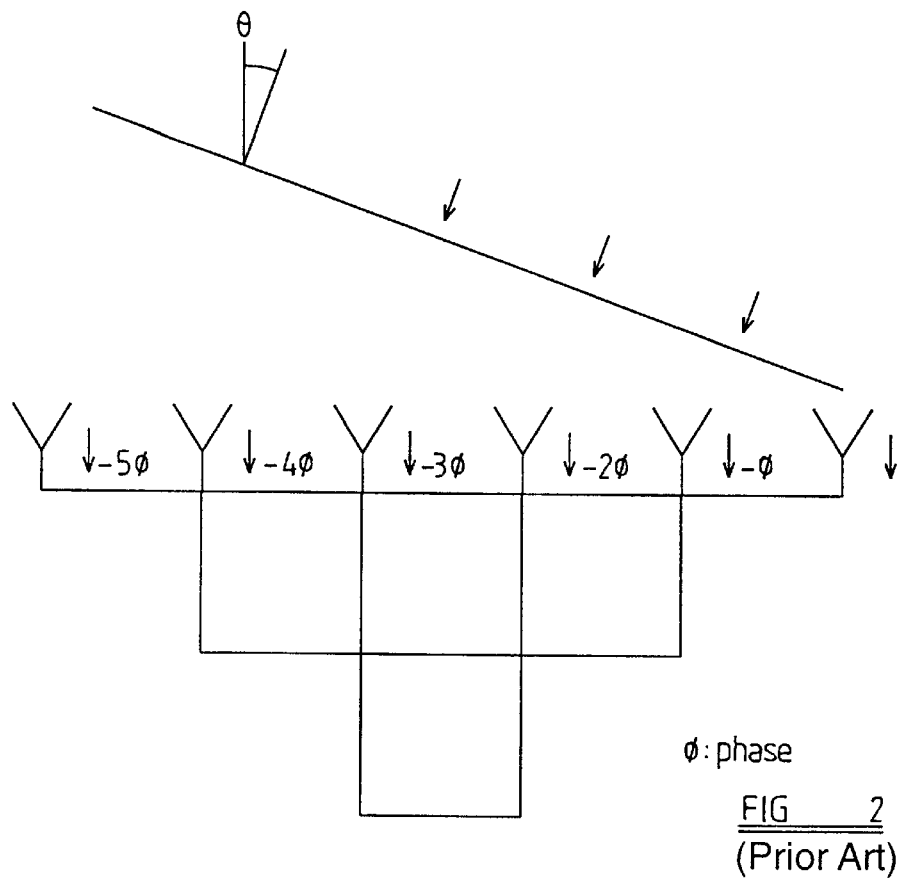
FIG. 2 is a schematic representation of a Van Atta array.
Figure 3:
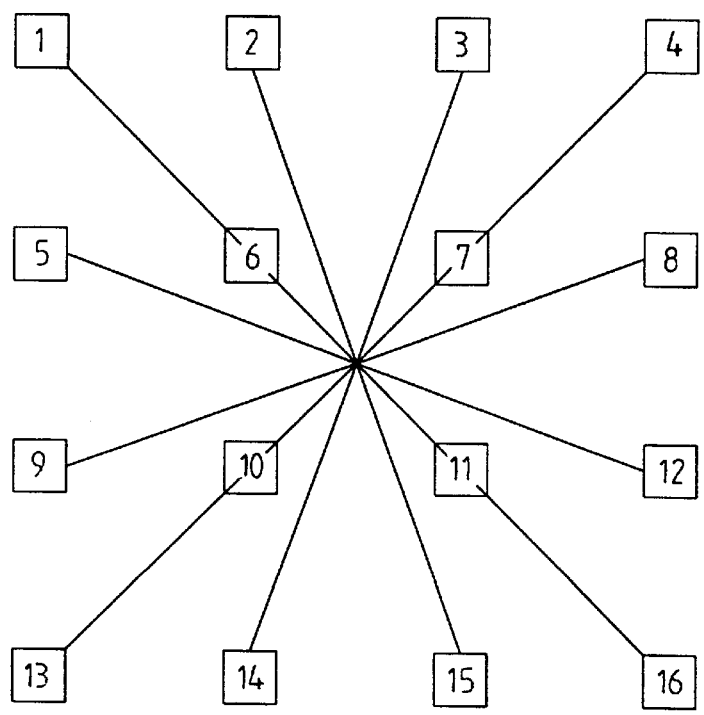
FIG. 3 is a plan view of a Van Atta array and the interconnections therefor.
Figure 10:
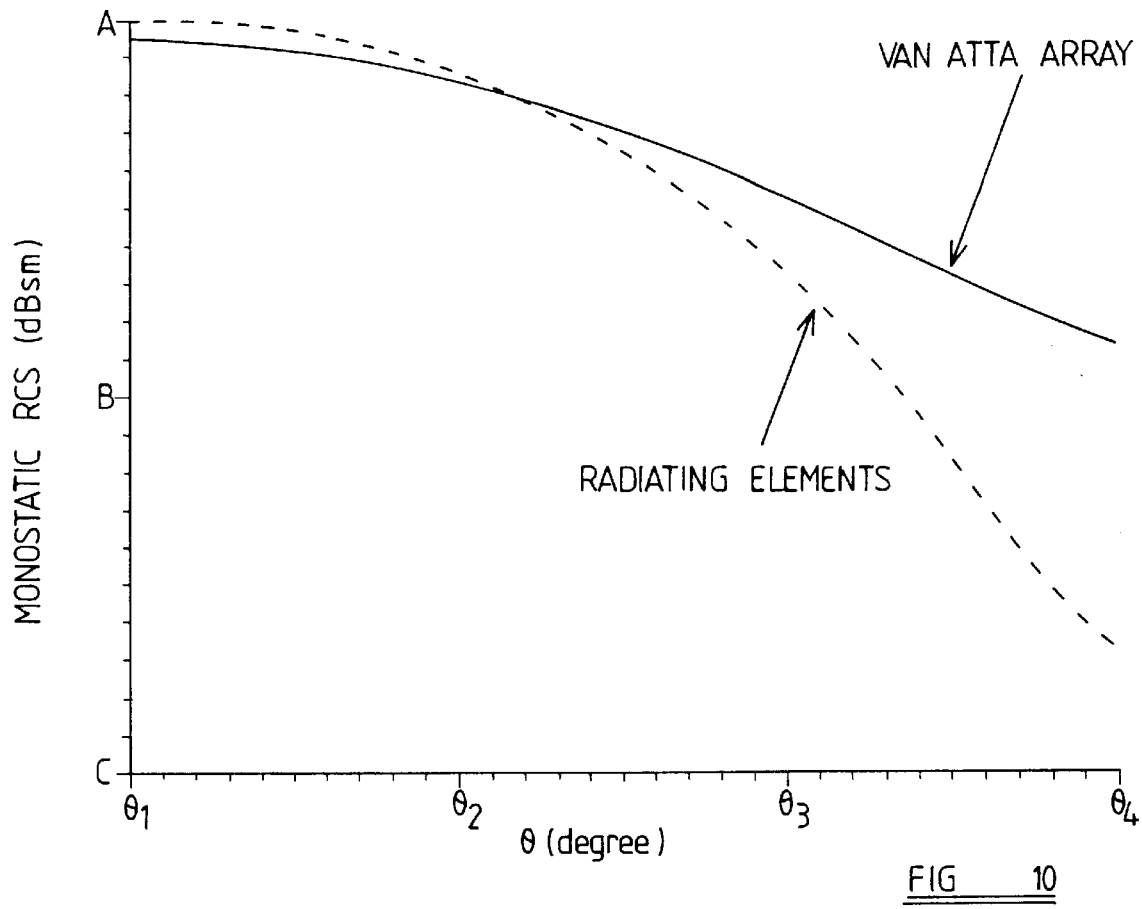
FIG. 10 is a graph showing the comparison between a Van Atta array and the transponder of FIGS. 8 and 9.

Referring to FIGS. 5 and 6, a simple form of RF identification transponder embodying the present invention comprises a ground plate 1 upon which is deposited a dielectric substrate layer 2. An array of M*N antenna elements are formed on the dielectric substrate 2. The antenna elements 3 in the array are all substantially identical. In the example shown in FIG. 6, M=4 and N=3 to create a regular rectangular array of 12 antenna elements, each antenna element 3 comprising a loop element in the form of a square. The antenna elements are constructed to have a common predetermined resonant frequency $f_r$. Thus, when the transponder of FIGS. 5 and 6 is irradiated by a range of frequencies $f_1$, $f_2 \ldots f_n$, then primarily only the predetermined resonant frequency $f_r$ is reflected back by the transponder. It is, of course, important that one of the frequencies which irradiates the transponder is substantially equal to the resonant frequency of the antenna elements 3 to ensure efficient reflection.

Thus, in a transponder reader system, there would be a number of transponders such as the one shown in FIGS. 5 and 6, each having a different resonant frequency. When irradiated by the range of frequencies (comprising a spectrum of the resonant frequencies of all the transponders), each transponder can be identified by the highest amplitude frequency reflected back, being the resonant frequency for that transponder. As shown in FIG. 7, the resonant frequency $f_r$ for the transponder shown in FIGS. 5 and 6, is substantially equal to the irradiating frequency $f_1$.

It is preferable that the resonant frequencies are chosen to be of a narrow band width so as to maximise the spectrum of resonant frequencies that can be used for identification purposes. A particularly convenient method for producing a narrow band width resonant frequency is by use of a micro-strip antenna. The resonant frequency is predominantly dependent upon the dimensions (M*N) of the array, the size of the individual antenna elements 3 within the array, the relative permitivity of the dielectric substrate, the length of any connection lines inter-connecting the antenna elements 3 and the method by which any connection lines are coupled to the antenna elements.

Using the reflection or back-scattering characteristics of the microstrip antenna elements, it is possible to effect reflection or back-scattering of a predetermined resonant frequency. For a fixed frequency, the array would consist of a plurality of substantially identical antenna elements 3, spaced apart and configured to optimise scattering. It should be noted that the size of the antenna element 3 is inversely proportional to the resonant frequency. Thus, small transponders can be produced to operate in the microwave frequency range.

The signal reflected from a particular array of antenna elements 3 is substantially made up of the common resonant frequency of the antenna elements 3. However, this signal is not generally re-directed straight back to the original signal transmitter and receiver since the angle of reflection from the transponder depends upon the angle of incidence at which the transmitted signal strikes the transponder. It is, therefore, desirable to achieve a certain amount of retrodirectivity, that is re-directing the reflected signal from the transponder back in the direction from which the signal originated.

As shown in FIGS. 8 and 9, a ground plate 1 is provided upon which is deposited a dielectric substrate layer 2. Referring specifically to FIG. 9, two connection lines 4A and 4B of equal length are laid down on the substrate 2, preferably using conventional microstrip techniques. A further substrate layer 5 is deposited over the connection lines 4A,4B and four microstrip antenna elements 3 are laid down on top of the second dielectric substrate layer 5. The antenna elements 3 are in the form of square loop elements. The centre of each square loop is positioned over one end of each of the connection lines 4A,4B so that each connection line 4A,4B couples a pair of antenna elements 3.

Figure 15:
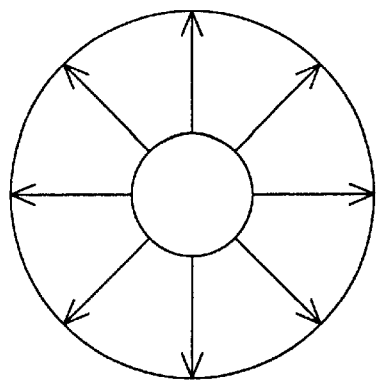
FIG. 15 is a cross-section through a conventional co-axial transmission line.
Figure 16:
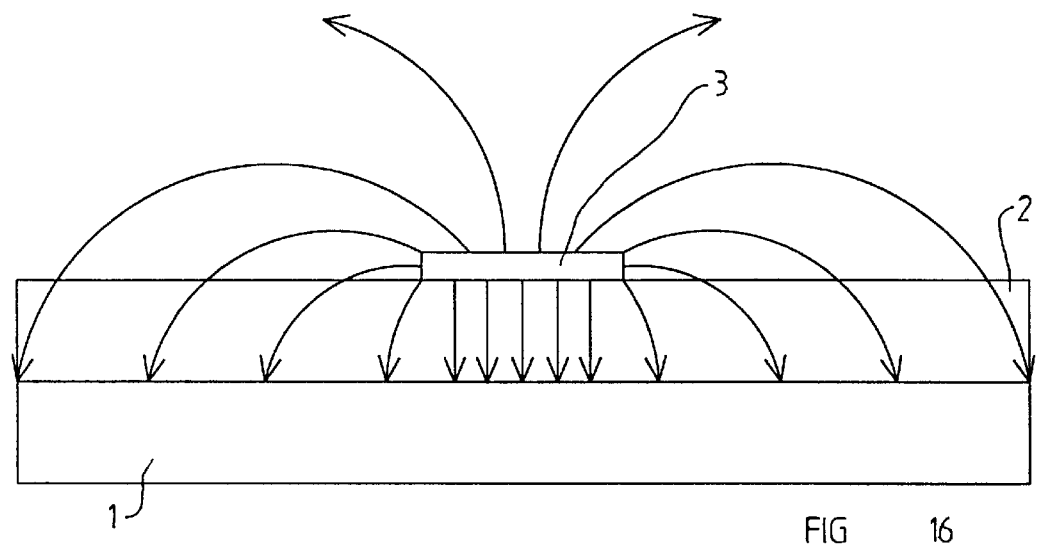
FIG. 16 is a cross-section through a micro-strip substrate for use with the present invention.

The antenna elements 3 are separated from the terminations of the connection lines 4A,4B by the second dielectric substrate layer 5. Thus, the antenna elements 3 are proximity coupled rather than direct coupled to the connection lines 4A,4B. Using the Van Atta technique requires the use of equal lengths of connection lines, so that the incident wave is reflected back in the same direction from whence it came. This same principle has been used in the embodiments shown in FIGS. 8 and 9, but has been implemented using microstrips. This differs from the conventional Van Atta array connection lines which use co-axial cables so that the signal is propagated along the shielded co-axial cable as shown in FIG. 15. In contrast, the microstrip implementation of a Van Atta array means that the connection lines are not shielded, or at least only partially shielded by the ground plate (see FIG. 16), and thus can introduce undesirable radiation effects due to parasitic coupling with the other antenna elements on the top surface of the transponder. This effect can degrade the retrodirectivity effect. Mutual coupling effects between respective connection lines also serve to degrade the retrodirectivity effect provided by the Van Atta array. However, using careful microstrip connection line routing and feeding techniques, it is possible to minimise any mutual coupling effects, thereby maximising the retrodirectivity effect of the array. Such an optimised routing of connection lines is shown in FIG. 9. It should be noted that the connection lines do not cross one another, and the distance between connection lines is maximised. The distance between respective connection lines should be at least a quarter of the wavelength of the signal carried by the connection line, i.e. a quarter of the guided wavelength.

Figure 17:
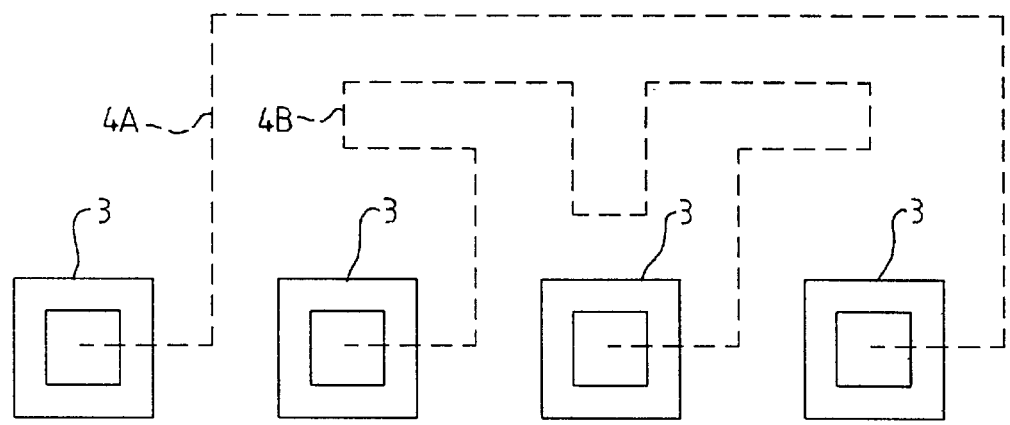
FIG. 17 is a schematic plan view of antenna elements coupled to arbitrary connection lines.
Figure 18:
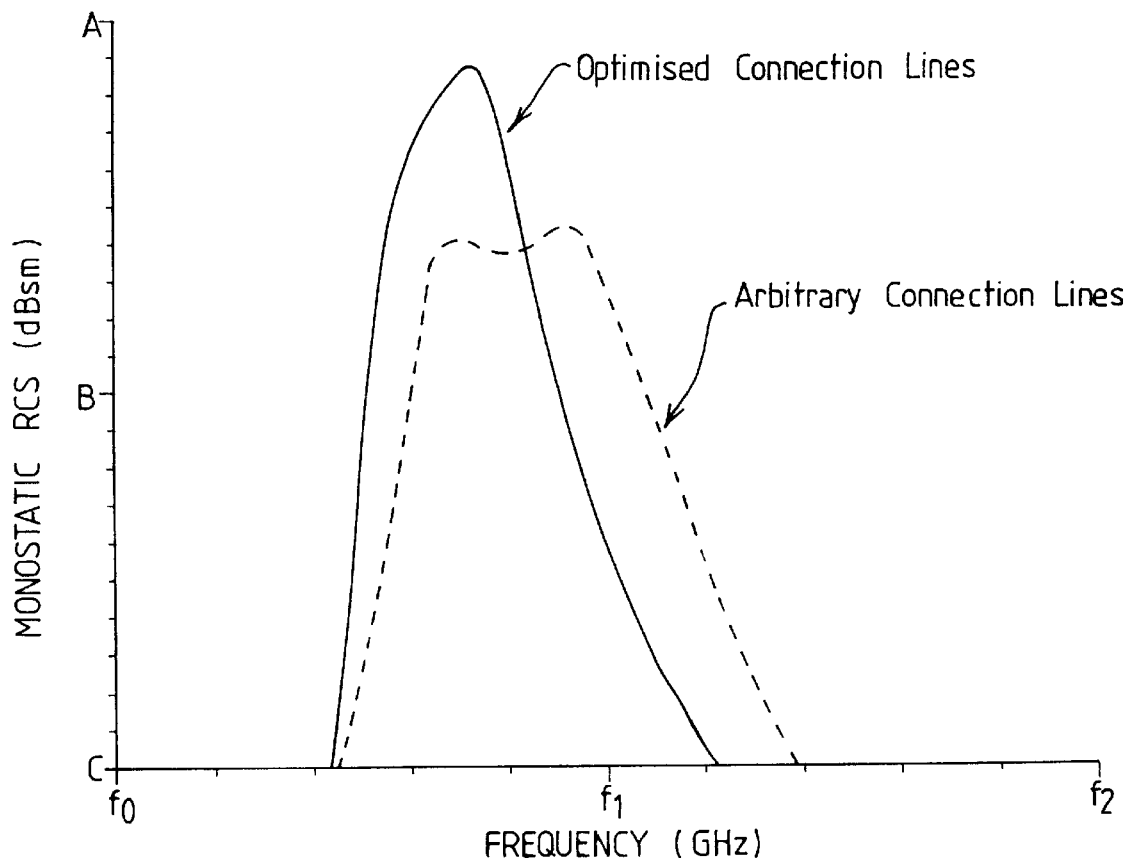
FIG. 18 is a graph comparing the frequency response of antenna elements coupled to arbitrary connection lines with the frequency response of antenna elements coupled to optimised connection lines embodying the present invention.

FIG. 17 shows a transponder in which the connection lines are equal in length but are located on the substrate in an arbitrary manner, in contrast to the optimised connection line routing shown in FIG. 9. The drop in retrodirectivity effectiveness is marked and is illustrated in FIG. 18 which shows the easily resolved, single peak, resonance exhibited by a transponder with an optimised connection line layout (see FIG. 9) as opposed to the double peak effect exhibited by the non-optimised connection line transponder of FIG. 17.

Figure 19:
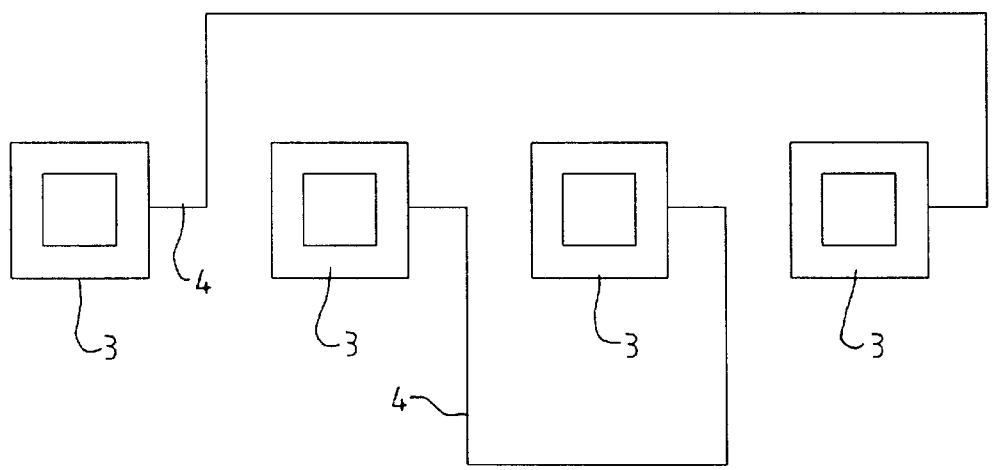
FIG. 19 is a schematic view of antenna elements for use with the present invention directly connected to connection lines.
Figure 20:
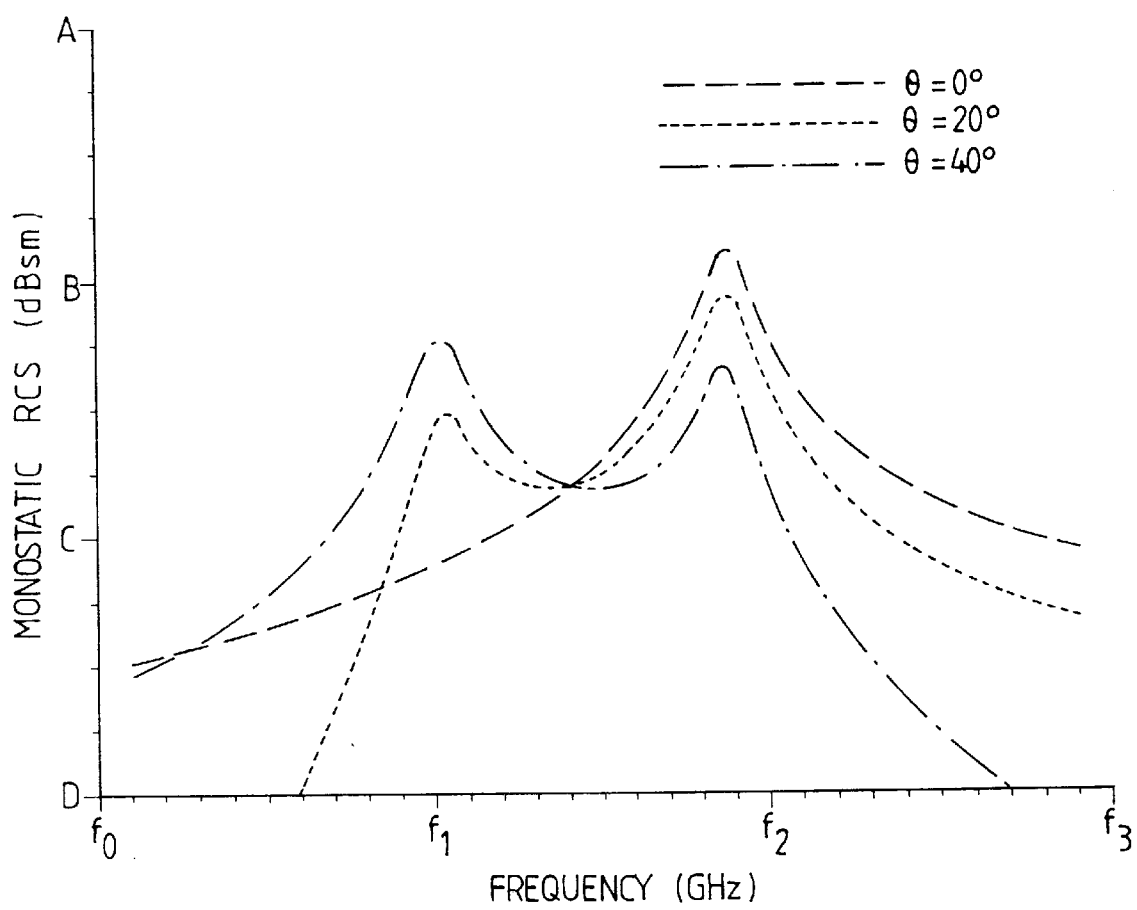
FIG. 20 is a graph indicating the variation of frequency response of a transponder having directly coupled connection lines depending upon the angle of incidence of the wavefront.

As previously described, the preferred method of coupling the connection lines to the antenna elements is by means of proximity coupling as shown in FIGS. 8 and 9. Whilst the connection lines 4A,4B can be connected directly to the antenna elements 3 as shown in the embodiment of the transponder in FIG. 19, the proximity coupling method is preferred. This is because the resonant frequencies of the antenna elements 3 are determined by the dimensions of the radiating structure and would, in the case of direct coupling, include the feed line from the connection line which would effectively add extra length to the antenna element 3 and therefore produce spurious lower resonating frequencies in addition to the primary resonant frequency of the antenna element. This could result in false identification resonant frequencies being reflected, or even creating shifts in the resonant frequency at high angles of signal incidence. Examples of the effect that a change in the incidence angle Q has on the perceived resonant frequency of an array of direct coupled antenna elements is shown in FIG. 20.

When Q=0°, a good single resonance peak is achieved, at incidence angles of Q=20° and 40°, secondary peaks are formed. In the case of Q=40°, the secondary peak even has a greater amplitude than the primary peak.

The RF signal comprises an electromagnetic wave which arrives at the transponder at arbitrary polarisations. To provide a stable resonant frequency which is not substantially affected by changes in the polarisation of the RF signal the microstrip antenna elements 3 can be provided with a loaded stub. FIG. 21 shows the loaded stub 10 attached to an antenna element 3 in the form of a square loop element. The loaded stub 10 projects from an outer edge of the loop element almost to the centre of the loop element.

The stub is placed in an orientation which helps to shift the incident polarisations so that the antenna element has the same resonant frequency for incident transverse electric fields and magnetic fields. Effectively, the stub increases the electrical length of the antenna, i.e. reduces the resonant frequency for that particular polarisation. For example, if the electric field E is incident along a Y access and the magnetic field is incident along an X access and if the resonant frequency of the transverse magnetic field, then a stub is placed symmetrically along the Y access at the connection line interface. This helps to increase the electrical length for the transverse electric field so that its resonant frequency will decrease and should lower to match the transverse magnetic field frequency.

Whilst previous embodiments of the invention have described the use of connection lines of equal length, the embodiment of the transponder shown in FIG. 22 utilises connection lines of unequal length. In this embodiment the connection lines 4 must have a length which is an integer multiple of the wavelength $1_g$ of the guided RF signal ± an integer multiple of half the guided wavelength, i.e. $r1_g \pm (p1_g/2)$, where r and p are integers. Thus, all the RF signals being reflected back will be in phase with one another. This allows the connection lines to be laid out in an optimal manner without sacrificing the retrodirectivity effect achieved by the coupling of antenna elements in pairs. The use of connection lines of unequal length also helps to reduce any mutual coupling between connection lines, since the connection lines of unequal length would not be resonant at the same frequency. The same considerations as for equal length connection lines apply to the routing of connection lines of unequal length.

Another advantage of unequal connection lines is that the lines need to be cornered or bent less than would the same number of connection lines of equal length (see FIG. 17). Bends and corners result in undesirable radiation effects so it is advantageous to keep such sharp discontinuities to a minimum.

Figure 11:
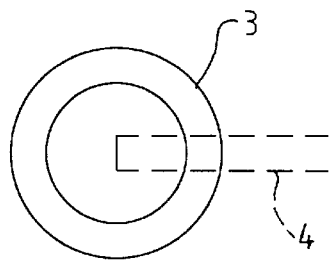
FIGS. 11, 12, 13 and 14 are schematic plan views of various antenna elements for use with the present invention.
Figure 12:
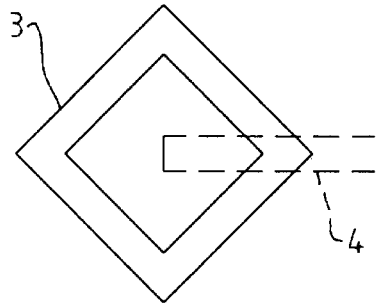
Figure 13:
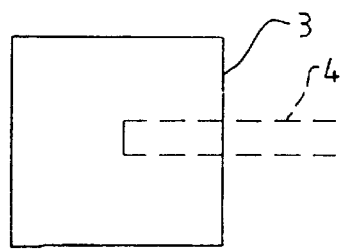
Figure 14:
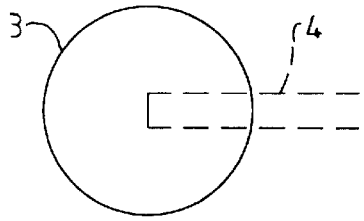

The above-described transponders will have a single common resonant frequency which is determined by a number of factors including the dimensions (M×N) of the array of antenna elements, the size of the antenna elements, the substrate characteristics, the length of any connection lines inter-connecting the antenna elements and the method by which any connection lines are coupled to the antenna elements. It is also possible to alter the resonant frequency of an array of antenna elements by using different configurations of antenna element. FIGS. 11 to 14 show four examples of possible antenna element configurations. FIG. 11 shows a circular loop element, FIG. 12 shows a square loop element, FIG. 13 shows a square patch element and FIG. 14 shows a circular patch element. It is, of course, possible to use antenna elements of any shape, although polygonal and circular loop elements and patches are preferred.

Figure 23:
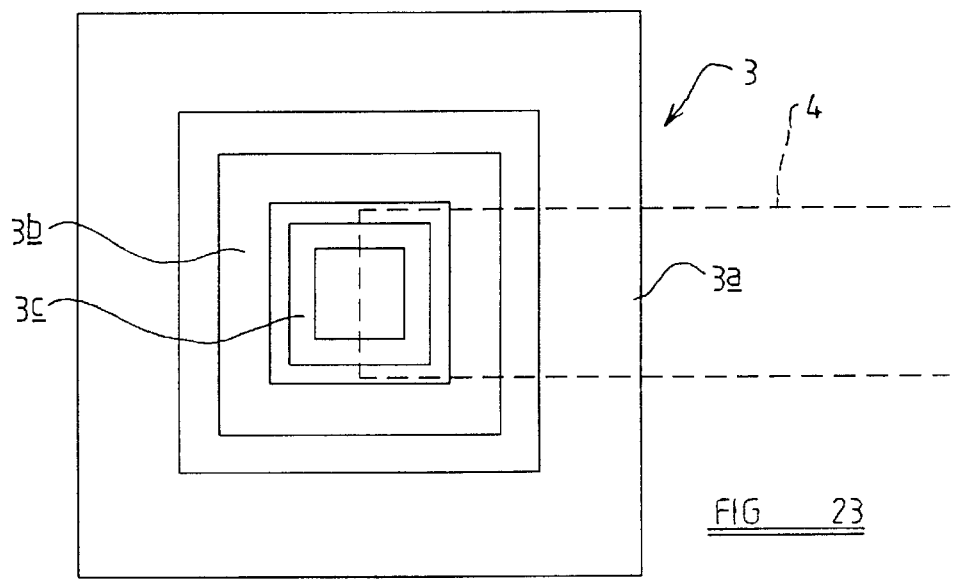
FIG. 23 is a schematic representation of multiple loop antenna elements for use with an embodiment of the present invention.

It is also possible to provide a transponder having more than one resonant frequency. FIG. 23 shows an example of an antenna element 3 consisting of three concentric square loop elements 3A, 3B, 3C which are proximity coupled to a common connection line 4. An array of such antenna elements would provide a transponder having three resonant frequencies.

Figure 24:
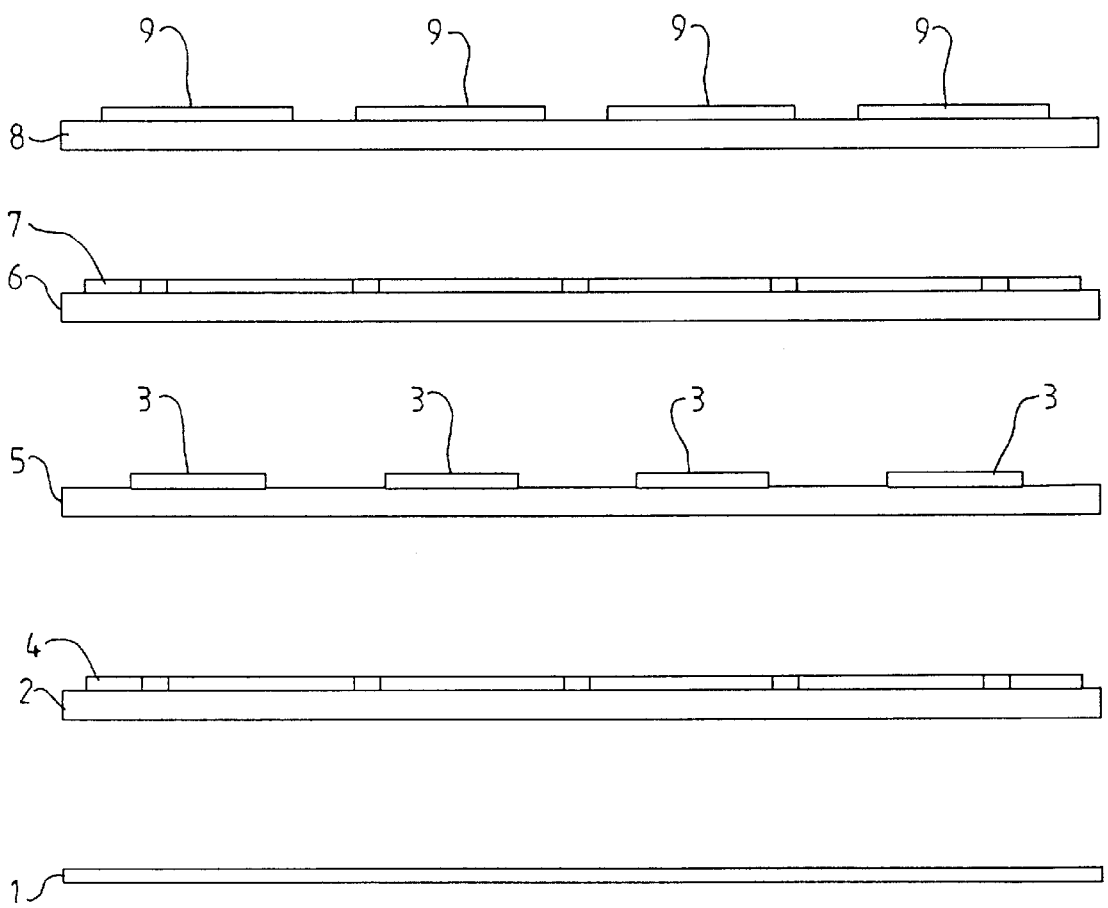
FIG. 24 is an exploded view of stacked antenna element arrays embodying the present invention.

Referring to FIG. 24, another method of allowing a transponder embodying the present invention to have more than one resonant frequency involves the sequential stacking of a ground plate 1, a first dielectric substrate layer 2, a first series of connection lines 4, a second substrate layer 5 and a first array of antenna elements 3. This structure provides a first common predetermined resonant frequency. In addition to this structure, a third dielectric layer 6, a further series of connection lines 7, a fourth dielectric layer 8 and a second antenna element array 9 are sequentially deposited over the first array of antenna elements 3.

The resultant structure has two arrays of antenna elements 3,9 each of which has a respective resonant frequency. Further resonant frequencies can be provided by stacking further layers of dielectric, connection lines and arrays of antenna elements.

An RF transponder reader or interrogator can be provided for use with any of the above transponders. The reader generates and transmits signals at a range of frequencies $f_1$, $f_2$, $f_3$, ... $f_n$, wherein the resonant frequencies of the one or more arrays in a respective transponder are reflected, thereby allowing identification of the transponder.

As shown in FIGS. 25 and 26, the transponder need not include a ground plane. This has the advantage of producing a very narrow bandwidth transponder (0.7% to 1% at 3 dB from peak reflection). There is no retrodirection effect but the narrow bandwidth enables the number of frequency identification codes to be increased within a given frequency spectrum. Such an arrangement is also useful for linear polarisation as opposed to the previously described dual polarisation.

In contrast to known transponders, the array of antenna elements are designed for relatively narrow bandwidth operation.

The antenna elements 3 making up the array are thin rectangular loops 3 having a length in the region of approximately half of the guided wavelength (0.5 $1_g$) and a width of between 0.015 $1_g$ and 0.1 $1_g$.

In another embodiment shown in FIG. 27, the antenna elements 3 each comprise a rectangular loop formed with a discontinuity or gap 10 to create a C-type element. This design provides a narrow bandwidth and compared to the thin rectangular loops 3 of FIGS. 25 and 26 better suppresses undesirable scatterings at much higher frequencies than the resonant frequency.

A further embodiment is shown in FIG. 28. The antenna array comprises a plurality of units cells 11, each consisting of a block of four square C-type elements 12. Each C-type element 12 in a cell 11 is rotated 90° with respect to its two neighbours. This arrangement has the advantage of a compact design, the unit cell size being only $0.4\ 1_g \times 0.4\ 1_g$. Moreover, the peak scattering is stable at the resonant frequency for orthogonal polarisations which would allow the reader antenna beam to be less sensitive to polarisation. Mutually rotated antenna elements in an array have been advocated in radiated antenna arrays but have not been applied in passive arrays such as in accordance with the present invention.

Figure 29:
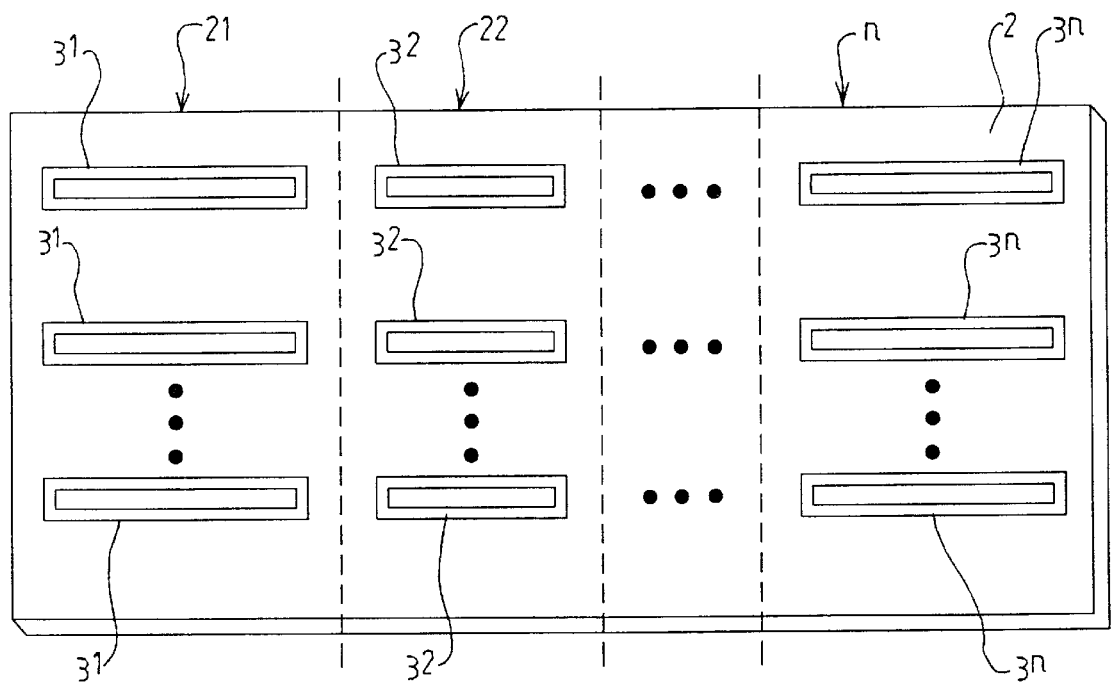
FIG. 29 is a plan view of a transponder embodying the present invention having an antenna array comprising a plurality of macrocells of antenna elements of common resonant frequency.
Figure 30:
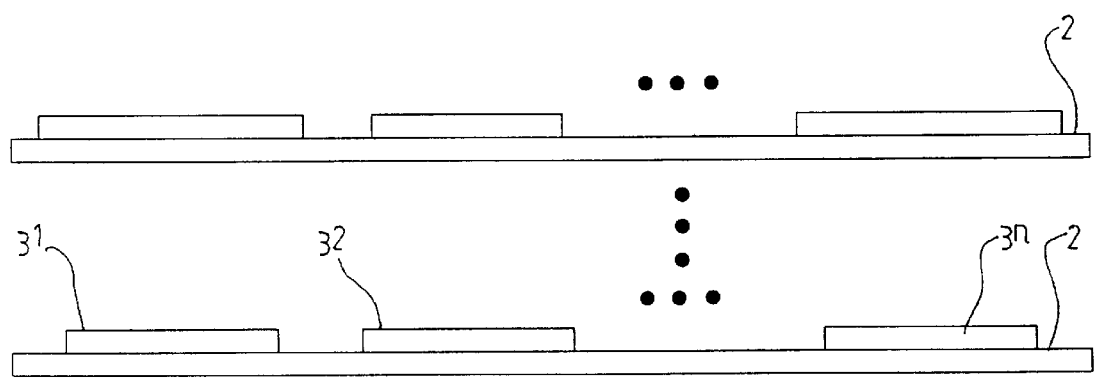
FIG. 30 is a side view of the transponder of FIG. 29 stacked onto a further transponder.

Another embodiment shown in FIG. 29 divides the antenna array up into a number of columns 21,22 . . . n which are herein termed macrocells. Each macrocell 21,22 . . . n consists of a column of identical antenna elements 3 or unit cells 11 of sequential rotated C-type elements 12. The macrocells are spaced sufficiently far apart, for example, 0.5 $1_g$ such that there is little or no coupling between adjacent macrocells 21,22 . . . n. The antenna elements 3 in each macrocell are resonant at their unique frequency. Thus, the antenna array comprises a number of macrocells 21,22 . . . n each having respective resonant frequencies so as to define a set of V resonant frequencies in any one array. Each frequency comprises an element of an identification code so that the identification code comprises the combinations of V frequencies. Multiple layers of further substrates 2 carrying macrocells 21,22 . . . n having different resonant frequencies can be stacked on top of one another (see FIG. 30) to increase the number of identification codes further.

In another embodiment, an object is to increase the number of identification codes using both the division of an array into unique macrocells and beam scanning from the reader. If the invention is arranged in one dimension of macrocells 21,22 . . . n, as shown in FIG. 29, then the corresponding reader beam is required to scan in one dimension. For planar structures, the antenna array is divided into two dimensions of macrocells 21,22 . . . n so the reader beam scans in two dimensions. A single macrocell 21,22 . . . n may consist of a column of identical elements 3 or a column of unit cells 11 of sequential rotated C-type elements 12. The antenna elements can be square loop, patches, etc. However, the antenna elements like thin loop, thin C-type or unit cells of sequential rotated C-type elements give much narrower bandwidth so more identification codes can be used in a given spectrum.

For one dimension scanning, a narrow radiated microwave beam from the reader will be required to scan horizontally across the columns to sense the presence of each column as shown in FIG. 29. If V resonant frequencies have been chosen with U columns, each time the radiated beam is focused at a particular column of elements, say, column 1, the resonant frequency, say, f3 will be back-scattered at its maximum value to indicate its presence. As the beam scans the next column, column 2 consisting of elements 3 or unit cells 11 resonating at f1, the resonant frequency f1 is back-scattered. Since the columns of elements/unit cell are interchangeable spatially, the resonant frequencies are unique in space. Hence, the number of identification codes are increased. Thus, for U columns and V resonant frequencies, the number of identification codes would be $V^u$. For example, 10 frequencies and 6 columns gives 1 million identification codes. The number of identification codes can be increased further using multiple stacked layers of macrocells.

The number of identification codes can be increased even further using two dimensional macrocells. An antenna array would consist of U columns and X rows of macrocells. Each macrocell would be resonating at one particular frequency in a set of V frequencies. Thus, for a two dimensional array, the number of identification codes would be $V^{u+x}$. This embodiment would also require a two dimensional reader for scanning in two dimensions.

Although the substrate has been described as a dielectric, the substrate may also be manufactured from a ferrite, isotropic or anisotropic material.

The metalisation material of the antenna elements may be replaced by a high temperature super conductor to reduce the bandwidth and/or to achieve a higher Q.

Of course, whilst the transponder has been described as a substantially passive device, it is to be appreciated that the invention would apply equally to active transponders.

What is claimed is:

1. In a transponder reader system, a plurality of RF identification transponders each of which comprises:
   a substrate layer; and
   an array of M*N antenna elements formed on the substrate layer, wherein the antenna elements have a common predetermined resonant frequency $f_r$ and M and N are integers,
   each of the transponders in the system having a different predetermined resonant frequency, wherein the respective different resonant frequencies of the antenna elements allow identification of the transponders.

2. A transponder according to claim 1, wherein each antenna element is connected to another one of the antenna elements by a connection line.

3. A transponder according to claim 2, wherein the connection lines are all of equal length.

4. A transponder according to claim 2, wherein the connection lines are of unequal length.

5. A transponder according to claim 2, wherein each connection line has a length of $r1_g \pm (p1_g/2)$, where r and p are integers.

6. A transponder according to claim 2, wherein the connection lines are routed in or on the substrate to minimise mutual RF coupling therebetween.

7. A transponder according to claim 2, wherein the connection lines do not cross one another in or on the substrate layer.

8. A transponder according to claim 2, wherein the connection lines are spaced apart by at least a quarter of the guided wavelength.

9. A transponder according to claim 2, wherein the connection lines are connected directly to the antenna elements.

10. A transponder according to claim 2, wherein the connection lines are separated from the antenna elements by at least a portion of the substrate layer and are proximity coupled to the antenna elements through the substrate layer.

11. A transponder according to claim 1, wherein the resonant frequency $f_r$ is determined by the size of the individual antenna elements.

12. A transponder according to claim 1, wherein the resonant frequency $f_r$ is determined by the dimensions (M*N) of the individual antenna elements.

13. A transponder according to claim 1, wherein each antenna element comprises a loop element or a patch element.

14. A transponder according to claim 13, wherein one or more of the antenna elements comprise multiple loop elements such that each antenna element has more than one predetermined resonant frequency $f_r$.

15. A transponder according to claim 13, wherein the antenna elements are of a polygonal or circular configuration.

16. A transponder according to claim 13, wherein the antenna element comprises a C-type loop element.

17. A transponder according to claim 16, wherein the C-type element is a thin rectangular loop formed with a discontinuity or gap.

18. A transponder according to claim 1, wherein one or more further arrays of antenna elements carried on respective substrate layers are provided, respective arrays comprising antenna elements having common predetermined resonant frequencies $f_{r1}, f_{r2}, f_{r3}, \ldots f_{rn}$, the transponder thereby having at least two resonant frequencies $f_{r1}, f_{r2}$.

19. A transponder according to claim 18, wherein the respective substrate layers carrying the arrays are stacked on top of one another.

20. A transponder according to claim 1, wherein a stub is provided on one or more of the antenna elements.

21. A transponder according to claim 1, wherein the substrate is formed on a ground plane.

22. A transponder according to claim 1, wherein the substrate is a dielectric material.

23. A transponder according to claim 22, wherein the resonant frequency $f_r$ is determined by the relative permitivity of the dielectric.

24. A transponder according to claim 1, wherein the substrate is a ferrite, isotropic or anisotropic materials.

25. A transponder according to claim 24, wherein the resonant frequency $f_r$ is determined by the relative permeability of the ferrite material.

26. A transponder according to claim 1, wherein the array of antenna elements is divided into a number of macrocells, each macrocell containing antenna elements of a common predetermined resonant frequency, each macrocell thereby having a resonant frequency.

27. A transponder according to claim 26, wherein the resonant frequencies of the macrocells in an array of antenna elements are different from one another.

28. A transponder according to claim 1, wherein the antenna array comprises a plurality of unit cells each consisting of a block of C-type antenna elements rotated with respect to one another within each unit cell.

29. A transponder according to claim 28, wherein each unit cell comprises a block of our antenna elements rotated at 90° with respect to one another.

30. An RF transponder reader in combination with a transponder according to claim 1, the reader comprising: means for generating and transmitting signals at a range of frequencies $f_1, f_2, f_3, \ldots f_n$, wherein at least one of the frequencies in the range of frequencies $f_1, f_2, f_3, \ldots f_n$ is substantially equal to the or each resonant frequency $f_r$ of the transponder; and means for detecting said one or each resonant frequency $f_r$.

* * * * *